United States Patent
Morris

(10) Patent No.: US 6,609,487 B1
(45) Date of Patent: Aug. 26, 2003

(54) COMPOSITE O-RING SEAL

(75) Inventor: Daniel C. Morris, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 154 days.

(21) Appl. No.: 09/711,209

(22) Filed: Nov. 9, 2000

(51) Int. Cl.[7] .................................................. F01M 9/10
(52) U.S. Cl. ............................ 123/90.38; 123/195 C; 123/198 E
(58) Field of Search ........................... 123/90.38, 193.5, 123/195 C, 198 E; 439/130, 271; 277/591, 651, 652

(56) References Cited

U.S. PATENT DOCUMENTS

| | | |
|---|---|---|
| 1,689,690 A | 10/1928 | Sandin |
| 4,508,072 A | 4/1985 | Takami et al. |
| 4,940,426 A | 7/1990 | Redmond et al. |
| 5,035,637 A | 7/1991 | Mathews et al. |
| 5,216,205 A | 6/1993 | Fujii et al. |
| 5,568,794 A | 10/1996 | Tabuchi et al. |
| 5,597,980 A | 1/1997 | Weber |
| 5,771,850 A | 6/1998 | Okada |
| 5,813,381 A | 9/1998 | Kakimoto et al. |
| 5,868,109 A | 2/1999 | Kunzel et al. |

*Primary Examiner*—Thomas Denion
*Assistant Examiner*—Ching Chang
(74) *Attorney, Agent, or Firm*—Andrew M Calderon

(57) ABSTRACT

A composite o-ring seal enables a wiring harness to extend from an exterior of the valve cover to an interior portion of the valve cover. The composite o-ring seal has at least one wire and an outer casing molded about the at least one wire. An entry opening extends from the outer casing at a first location and an exit opening extends from the outer casing at a second location. The entry and exit openings allow the wire to extend from the outer casing so that it may be connected between components on opposing sides of the valve cover without having to modify the engine block or other components.

14 Claims, 1 Drawing Sheet

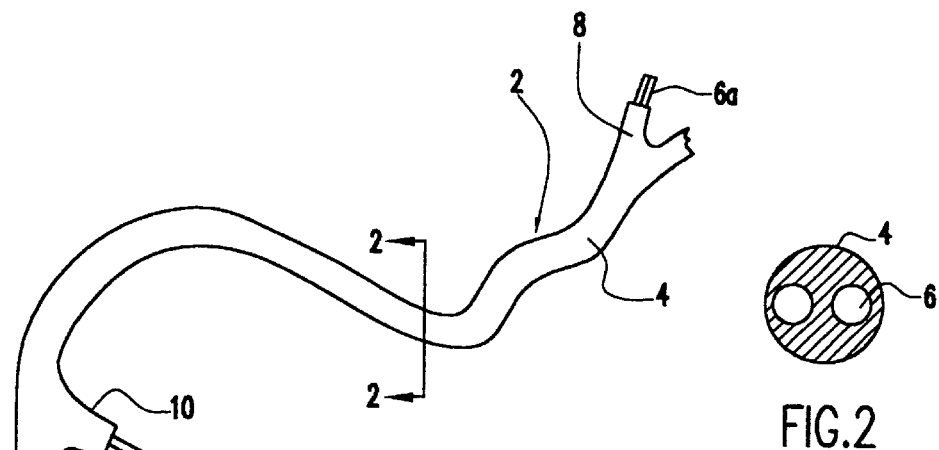
FIG.2
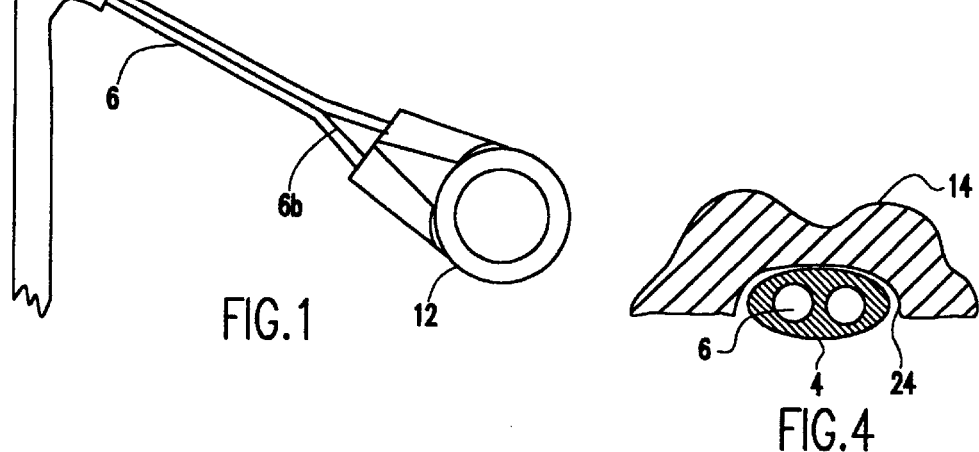
FIG.1
FIG.4
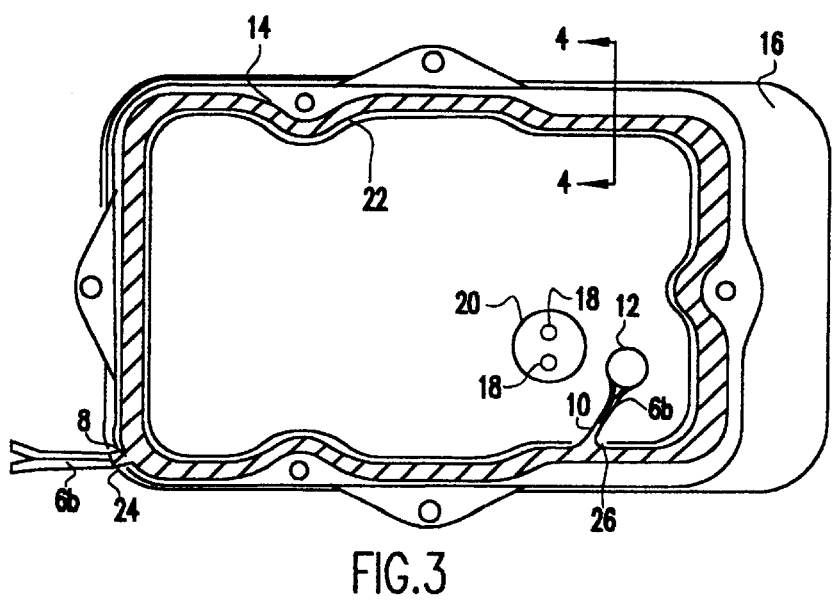
FIG.3

COMPOSITE O-RING SEAL

TECHNICAL FIELD

This invention relates generally to an o-ring seal and, more particularly, to a composite o-ring seal for use on an internal combustion engine.

BACKGROUND ART

Diesel engines typically inject fuel directly into a combustion chamber of a cylinder, e.g., direct fuel injection, during the operation of the Diesel engine. In particular, the Diesel engine intakes air, compresses the air and then injects the fuel directly into the combustion chamber. The heat of the compressed air is then used to ignite the fuel within the combustion chamber.

The fuel is injected into the combustion chamber via a fuel injector. The fuel injector is typically controlled by a Mechanical Unit Injector (MUI) which is positioned in the interior portion of the valve cover of the Diesel engine. It is noted that the fuel injector on a Diesel engine is one of the most complex components of the Diesel engine and has thus been the subject of a great deal of experimentation and improvement over the years. For example, the location of the fuel injector has been moved to a variety of locations and has also been modified to withstand the temperature and pressure inside the cylinder in order to deliver the fuel in a fine mist.

The MUI also includes some mechanical limitations which may affect the control aspects of the injection event. These limitations result in variations in the rate of injection, e.g., injecting fuel too rapidly within a given injection event. Such problems can adversely affect emission outputs and fuel economy.

To solve the problems associated with the MUI, Electronic Unit Injectors (EUI) have been utilized in the Diesel engine. The EUI is capable of controlling the fuel injector in a more responsive and controlled manner so as to avoid many of the problems associated with the MUI. It is noted that MUIs are still widely used in Diesel engines and, in applications, are capable of performing at a high level of responsiveness and control. The EUI is typically mounted to the engine block within the interior portion of the valve cover. This enables the EUI to be in close proximity with the fuel injector.

However, it is necessary to connect the EUI not only with the fuel injector, via a solenoid connector, but it is also necessary to connect the EUI with a controller. This control unit is located exteriorly to the valve cover. In order to make the connection between the EUI solenoid connector and the control unit, a wire harness must be connected between the interior portion for the valve cover to a location which is exterior to the valve cover. To accomplish this wiring, modifications are made to the valve cover as well as the engine block and other components. These modifications add to the fabrication costs associated with the Diesel engine.

U.S. Pat. No. 5,771,850 to Okada, which issued on Jun. 30, 1998, shows a cylinder head cover having a wiring portion. The cylinder head cover includes a plurality of external connectors which are externally arranged on a side wall of the cylinder head cover. A control-unit connector is arranged on an end of the cylinder head cover. The control-unit connector includes terminals for connecting to an electronic control unit of the engine. A wiring portion having electric connections for interconnecting the contacts and the terminals of the control-unit connector is also provided on the cylinder head cover. The wiring portion is integral with a wall of the cylinder head cover. Thus, the head cover has been greatly modified in order to accommodate wiring and connection terminals.

The present invention is directed to overcoming one or more of the problems as set forth above.

DISCLOSURE OF THE INVENTION

In one aspect of the present invention a composite o-ring seal includes at least one wire and an outer casing molded about the at least one wire. An entry opening land an exit opening extend from the outer casing.

In another aspect of the present invention, an internal combustion engine having a composite o-ring seal is provided. The internal combustion engine includes an engine block and a valve cover mounted on the engine block. A groove is formed in the valve cover which includes a first channel and a second channel. The first channel extends to an exterior of the valve cover and the second channel extends to an interior of the valve cover. The composite o-ring seal is positioned within the groove of the valve cover. An entry opening and an exit opening extend from the outer casing and correspond to the first channel and the second channel, respectively.

BRIEF DESCRIPTION OF THE DRAWINGS

FIG. 1 shows a diagrammatic top plan view of the composite o-ring seal of the present invention;

FIG. 2 shows a cross sectional view of the composite o-ring seal along line 2—2 of FIG. 1;

FIG. 3 shows a diagrammatic top plan view of the composite o-ring seal of the present invention mounted within a groove of a valve cover of an engine block; and FIG. 4 shows a cross sectional view of the composite o-ring seal along line 4—4 of FIG. 3.

BEST MODE FOR CARRYING OUT THE INVENTION

FIG. 1 shows a composite o-ring seal of the present invention generally depicted as reference numeral 2. The composite o-ring seal 2 includes an outer casing 4 having, for example, a flexible elastomer material such as, for example, either a highly saturated nitrile rubber (HSN) or a fluorocarbon such as a vinylidene fluoride. In the preferred embodiment, the outer casing 4 is preferably designed to withstand at least 10 mating/unmating cycles of a head valve cover without any leak failures. The outer casing 4 is molded around a wire 6. It should be understood that the outer casing 4 may also be molded around two or more wires.

FIG. 1 also shows an entry opening 8 and an exit opening 10 extending from the outer casing 4. The entry opening 8 and the exit opening 10 may extend from any location along the composite o-ring seal 2 and is thus not limited to any particular location. In the preferred embodiment, a first end 6a of the wire 6 extends from the outer casing 4 at the entry opening 8 and a second end 6b of the wire 6 extends from the outer casing 4 at the exit opening 10. The second end 6b of the wire 6 preferably connects to an electronic component such as an Electronic Unit Injection (EUI) solenoid connector 12. The EUI solenoid connector 12 is provided for illustrative purposes only and should not be construed as a limiting feature of the present invention.

FIG. 2 shows a cross sectional view of the composite o-ring seal 2. As seen in FIG. 2, the outer casing 4 is molded around (e.g., encases) two wires 6. In the embodiment of FIG. 2, the outer diameter of the outer casing 4 is approximately 6 mm (approximately 0.24 inches) and is more preferably 5.89 mm. The outer diameter of the wire 6 is approximately 1.75 mm (approximately 0.07 inches) and is more preferably 1.78 mm. It should be understood by those of ordinary skill in the art that the diameter of both the outer casing 4 and wire 6 may vary, depending on the particular application used with the present invention.

FIG. 3 shows the composite o-ring seal 2 mounted within a groove of a valve cover. In particular, FIG. 3 shows a valve cover 14 mounted to an engine block 16 of an internal combustion engine. The engine block 16 includes, amongst other features, valves 18, cylinders 20 as well as the EUI solenoid connector 12.

The valve cover 14 includes a groove 22. The composite o-ring seal 2 is positioned within the groove 22. The groove 22 includes a first channel 24 and a second channel 26. The first channel 24 extends from the groove 22 to an exterior of the valve cover 14 and the second channel 26 extends from the groove 22 to an interior portion of the valve cover 22. The first channel 24 and the second channel 26 correspond respectively to the entry opening 8 and exit opening 10 of the outer casing 4.

FIG. 4 shows the composite o-ring seal 2 along line 4—4 of FIG. 3 in a compressed state, i.e., when the valve cover 14 is mounted to the engine block 16. In the preferred embodiment, the composite o-ring seal 2 is compressed to approximately 65% and more preferably 67.5% of the original diameter of the composite o-ring seal 2. It is noted that the compression ratio of the composite o-ring seal 2 may be a function of (i) the material used for the composite o-ring seal 2, (ii) the diameter of the wire 6 or (iii) the torque applied to bolts mounting the valve cover 14 to the engine block 16.

Industrial Applicability

In operation, the composite o-ring seal 2 is mounted within the groove 22 of the valve cover 14. The entry opening 8 of the outer casing 4 is positioned within and extends from the first channel 24. This allows the wire 6 to extend from a location which is exterior to the valve cover 14 to within the groove 22. The exit opening 10 of the outer casing 4 is positioned within and extends from the second channel 26. This allows the wire 6 to extend from within the groove 22 to the interior portion of the valve cover 14.

The second end 6b of the wire is connected to the EUI solenoid connector 12. The valve cover 14 is then mounted onto the engine block 16 of the internal combustion engine. In this manner, wires can be connected between a control unit (which is at a location on exterior to the valve cover) and the EUI solenoid connector 12 located in the interior portion of the valve cover 14.

Other aspects, objects and advantages of this invention can be obtained from a study of the drawings, the disclosure and the appended claims.

What is claimed is:

1. A composite o-ring seal, comprising:
    at least one wire having a first end and a second end;
    an outer casing molded about the at least one wire;
    an entry opening extending from the outer casing at a first location and in a first direction; and
    an exit opening extending from the outer casing at a second location separated from the first location along a length of the outer casing and in a second direction.

2. The composite o-ring seal of claim 1, wherein the first end of the at least one wire extends from the entry opening and the second end of the at least one wire extends from the exit opening.

3. The composite o-ring seal of claim 1, wherein the outer casing is made from a flexible elastomer material.

4. The composite o-ring seal of claim 3 wherein the outer casing is made from one of a highly saturated nitrile rubber (HSN) and a fluorocarbon.

5. The composite o-ring seal of claim 3, wherein the flexible elastomer material is capable of withstanding at least 10 mating/unmating cycles without any leak failures.

6. The composite o-ring seal of claim 1, wherein the at least one wire is two wires.

7. The composite o-ring seal of claim 1, wherein the outer casing is capable of being compressed to approximately 65% of an original diameter of the outer casing.

8. The composite o-ring seal of claim 1, wherein an outer diameter of the outer casing is approximately 6 mm and an outer diameter of the at least one wire is approximately 1.75 mm.

9. The composite o-ring seal of claim 1, wherein the outer casing forms a loop and the first direction extends outside the loop and the second direction extends inward of the loop.

10. An internal combustion engine, comprising:
    an engine block;
    a solenoid connector mounted on the engine block;
    a valve cover mounted on the engine block, the solenoid connector being located in an interior portion of the valve cover;
    a groove formed in the valve cover;
    a first channel extending from the groove to an exterior of the valve cover;
    a second channel extending from the groove to an interior of the valve cover;
    a composite o-ring seal positioned within the groove of the valve cover, the composite o-ring seal including:
    at least one wire;
    an outer casing molded about the at least one wire, the outer casing positioned within the groove;
    an entry opening extending from the outer casing and positioned partially within the first channel; and
    an exit opening extending from the outer casing and positioned partially within the second channel.

11. The internal combustion engine of claim 10, wherein the at least one wire includes a first end and a second end.

12. The internal combustion engine of claim 11, wherein the first end of the at least one wire extends from the entry opening of the outer casing to an exterior of the valve cover.

13. The internal combustion engine of claim 12, wherein the second end of the at least one wire extends from the exit opening of the outer casing to an interior portion of the valve cover.

14. The internal combustion engine of claim 11, wherein the second end of the at least one wire connects to the solenoid connector.

* * * * *